United States Patent
Takeuchi et al.

(10) Patent No.: US 11,824,353 B2
(45) Date of Patent: Nov. 21, 2023

(54) DC POWER DISTRIBUTION SYSTEM

(71) Applicant: MITSUBISHI ELECTRIC CORPORATION, Tokyo (JP)

(72) Inventors: Hayato Takeuchi, Tokyo (JP); Kenichi Fukuno, Tokyo (JP); Takaharu Ishibashi, Tokyo (JP); Takushi Jimichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 17/618,523

(22) PCT Filed: Jun. 5, 2020

(86) PCT No.: PCT/JP2020/022249
§ 371 (c)(1),
(2) Date: Dec. 13, 2021

(87) PCT Pub. No.: WO2021/044686
PCT Pub. Date: Mar. 11, 2021

(65) Prior Publication Data
US 2022/0247173 A1    Aug. 4, 2022

(30) Foreign Application Priority Data
Sep. 2, 2019    (JP) ................. 2019-159252

(51) Int. Cl.
*H02J 1/08*        (2006.01)
*H02M 5/10*     (2006.01)
*H02M 7/06*     (2006.01)

(52) U.S. Cl.
CPC ............... *H02J 1/08* (2013.01); *H02M 5/10* (2013.01); *H02M 7/064* (2013.01)

(58) Field of Classification Search
CPC .. H02J 1/08; H02J 1/102; H02M 5/10; H02M 7/064; H02M 1/325; H02H 3/087;
(Continued)

(56) References Cited

U.S. PATENT DOCUMENTS 5,576,580 A    11/1996 Hosoda et al.

FOREIGN PATENT DOCUMENTS

JP    H07186788 A    7/1995
JP    2010130869 A  *  6/2010
(Continued)

OTHER PUBLICATIONS

International Search Report (PCT/ISA/210) with translation and Written Opinion (PCT/ISA/237) dated Aug. 25, 2020, by the Japan Patent Office as the International Searching Authority for International Application No. PCT/JP2020/022249. (8 pages).

*Primary Examiner* — Elim Ortiz
(74) *Attorney, Agent, or Firm* — BUCHANAN INGERSOLL & ROONEY PC (57) ABSTRACT

A DC power distribution system includes: a transformer; a rectification device; a DC bus through which DC power flows; a plurality of DC branch lines branching off from the DC bus; an AC interrupting portion connected to an input side of the transformer; a first DC interrupting portion connected between the rectification device and the DC bus; and a plurality of second DC interrupting portions respectively provided to the plurality of DC branch lines. An interrupting-operation time for each second DC interrupting portion is set to be shorter than interrupting-operation times for the AC interrupting portion and the first DC interrupting portion. An inductance value of a short-circuit impedance of the transformer is set to a value at which short-circuit current can be limited to take a value not larger than a maximum current value permitted for the rectification device.

11 Claims, 4 Drawing Sheets

(58) Field of Classification Search
CPC .......... H02H 1/0015; H02H 3/00; H02H 3/02; H02H 3/06; H02H 3/07; H02H 3/10; H02H 3/16; H02H 3/38; H02H 3/44; H02H 7/268; G01R 31/08; G01R 31/1272; H01L 2224/14; H01L 2224/16225; H01L 33/507; H01L 33/54; H01L 33/60; H01L 33/642
See application file for complete search history.

(56) References Cited

FOREIGN PATENT DOCUMENTS

| | | | | |
|---|---|---|---|---|
| JP | 2011130636 A | 6/2011 | | |
| WO | WO-2009081912 A1 | * 7/2009 | .............. | H02J 1/102 |
| WO | WO-2009081980 A1 | * 7/2009 | .............. | H01L 33/60 |
| WO | WO-2017221493 A1 | * 12/2017 | .............. | G01R 31/08 |

* cited by examiner

Location of short-circuit failure

Location of short-circuit failure

DC POWER DISTRIBUTION SYSTEM

TECHNICAL FIELD

The present disclosure relates to a DC power distribution system.

BACKGROUND ART

A DC power distribution system for supplying DC power to a plurality of loads has been known. Such a DC power distribution system is provided with a circuit breaker for protecting the entire system. If a short-circuit failure occurs at one load among the plurality of loads, there is a case where excessive short-circuit current flows and the circuit breaker performs an interrupting operation so that the entire DC power distribution system is halted. If the entire DC power distribution system is halted, the loads capable of normal operations are also halted.

In order to prevent the entire DC power distribution system from being halted when a short-circuit failure occurs, a DC power distribution system including a current-limitation circuit for limiting short-circuit current has been disclosed (see, for example, Patent Document 1).

CITATION LIST

Patent Document

Patent Document 1: Japanese Laid-Open Patent Publication No. 7-186788

SUMMARY OF THE INVENTION

Problems to be Solved by the Invention

In the conventional DC power distribution system, the current-limitation circuit is implemented by a series circuit composed of a resistor and a reactor. However, since short-circuit current is an excessive current, it is necessary to increase the current-carrying capacities of the resistor and the reactor which compose the current-limitation circuit. Thus, a problem arises in that cost for and the size of the DC power distribution system increase.

The present disclosure has been made to solve the above problem, and an object of the present disclosure is to suppress increases in cost for and the size of a DC power distribution system capable of limiting short-circuit current.

Solution to the Problems

A DC power distribution system according to the present disclosure includes: a transformer configured to convert an AC power inputted to the transformer into an AC power at a different voltage and output the AC power obtained by the conversion; a rectification device configured to convert the AC power outputted from the transformer into a DC power and output the DC power; a DC bus through which the DC power outputted from the rectification device flows; a plurality of DC branch lines branching off from the DC bus; an AC interrupting portion connected to an input side of the transformer; a first DC interrupting portion connected between the rectification device and the DC bus; and a plurality of second DC interrupting portions respectively provided to the plurality of DC branch lines. An interrupting-operation time for each second DC interrupting portion is set to be shorter than an interrupting-operation time for the AC interrupting portion and an interrupting-operation time for the first DC interrupting portion. An inductance value of a short-circuit impedance of the transformer is set to a value at which current that flows to the rectification device when short-circuit current flows in the DC power distribution system can be limited to take a value not larger than a maximum current value permitted for the rectification device.

Effect of the Invention

In the DC power distribution system according to the present disclosure, the inductance value of the short-circuit impedance of the transformer is set to a value at which current that flows to the rectification device when short-circuit current flows in the DC power distribution system can be limited to take a value not larger than the maximum current value permitted for the rectification device. Thus, no current-limitation circuit for limiting short-circuit current is necessary. As a result, increases in cost for and the size of the DC power distribution system can be suppressed.

DESCRIPTION OF EMBODIMENTS

Hereinafter, DC power distribution systems according to embodiments for carrying out the present disclosure will be described in detail with reference to the drawings. The same or corresponding portions are denoted by the same reference characters in the drawings.

Embodiment 1

Figure 1:
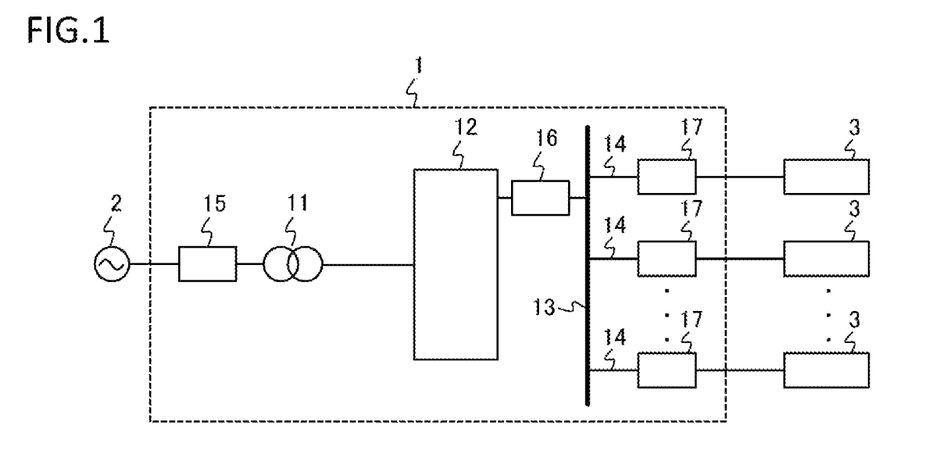
FIG. 1 is a configuration diagram of a DC power distribution system according to embodiment 1.

FIG. 1 is a configuration diagram of a DC power distribution system according to embodiment 1. A DC power distribution system 1 according to the present embodiment includes: a transformer 11 configured to convert an AC power inputted from a power distribution grid 2 to the transformer 11 into an AC power at a different voltage and output the AC power obtained by the conversion; a rectification device 12 configured to convert the AC power outputted from the transformer 11 into a DC power and output the DC power; a DC bus 13 through which the DC power outputted from the rectification device 12 flows; a plurality of DC branch lines 14 branching off from the DC bus 13; an AC interrupting portion 15 connected to an input side of the transformer 11; a first DC interrupting portion 16 connected between the rectification device 12 and the DC bus 13; and a plurality of second DC interrupting portions 17 respectively provided to the plurality of DC branch lines 14. A plurality of loads 3 are respectively connected to the plurality of DC branch lines 14 of the DC power distribution system 1. The DC power distribution system 1 has a function of converting an AC power inputted from the power distribution grid 2 into a DC power and supplying the DC power to each of the plurality of loads 3. The relationship of the plurality of loads 3 is such that they are in parallel to one another and connected to the DC bus 13 of the DC power distribution system 1.

The transformer 11 has a primary winding and a secondary winding. The primary winding is connected to the power distribution grid 2 via the AC interrupting portion 15. The secondary winding is connected to the rectification device 12. Since the AC interrupting portion 15 is connected to the primary winding side of the transformer 11, the AC interrupting portion 15 performs an interrupting operation at the time of a short-circuit failure of the winding of the transformer. Thus, the reliability of the DC power distribution system 1 is improved.

In the present embodiment, each of the AC interrupting portion 15, the first DC interrupting portion 16, and the second DC interrupting portions 17 is implemented by, for example: a semiconductor circuit breaker having a semiconductor element; a molded case circuit breaker (hereinafter, "no-fuse breaker") that performs opening/closing between mechanical contacts, to disconnect a current path; a fuse in which, when high current flows, a conductor melts owing to Joule heat, to disconnect a current path; or the like. It is noted that appropriate designing of these interrupting portions makes it possible to adjust an interrupting-operation time (described later) for each interrupting portion.

Figure 2:
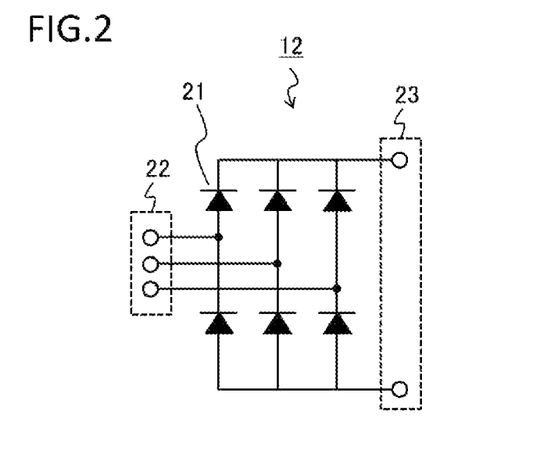
FIG. 2 is a configuration diagram of a rectification device in embodiment 1.

FIG. 2 is a configuration diagram of the rectification device 12 in the present embodiment. The rectification device 12 in the present embodiment is a diode rectifier and is a three-phase bridge rectifying circuit provided with: six diodes 21; AC terminals 22 to which a three-phase AC power is inputted; and DC terminals 23 from which a DC power is outputted. A three-phase AC power outputted from the transformer 11 is inputted to the AC terminals 22. The rectification device 12 converts the three-phase AC power inputted to the AC terminals 22 into a DC power and outputs the DC power from the DC terminals 23 via the first DC interrupting portion 16 to the DC bus 13. It is noted that, although the three-phase bridge rectifying circuit that converts a three-phase AC power into a DC power is described as the rectification device 12 in the present embodiment, the rectification device 12 is not limited thereto as long as the rectification device 12 is a diode rectifier that converts an AC power into a DC power by using a diode. It is noted that the diode rectifier may have a configuration in which a plurality of diodes are connected in parallel as necessary in order to allow for increase in current.

The ratio between the number of turns of the primary winding and the number of turns of the secondary winding of the transformer 11 is determined according to the relationship among the output voltage of the DC power distribution system 1, the AC voltage on the primary winding side of the transformer 11, the AC voltage on the secondary winding side of the transformer 11, and the like. The primary winding of the transformer 11 is provided with a tap such that the voltage of the secondary winding becomes constant even when the voltage of the power distribution grid fluctuates. The diode rectifier does not have any function of controlling DC voltage. Thus, when the AC voltage inputted from the transformer 11 fluctuates in association with the fluctuation of the AC voltage of the power distribution grid, the output voltage of the DC power distribution system 1 also fluctuates. If the output voltage of the DC power distribution system 1 fluctuates to fall outside an operation voltage range for any of the loads 3, the load 3 becomes unable to be operated. However, since the AC voltage on the secondary winding side is kept constant by providing the tap to the primary winding, the output voltage of the DC power distribution system 1 becomes constant without being influenced by fluctuation of the voltage of the power distribution grid 2. Thus, the reliability of the DC power distribution system 1 is improved.

In general, in a transformer, a leakage magnetic flux interlinks with each of a primary winding and a secondary winding. Thus, the transformer has a short-circuit impedance. When short-circuiting is caused on the secondary winding side of the transformer and the voltage is increased from the primary winding, a current flows in the secondary winding. The current in the secondary winding is proportionate to a current in the primary winding. A value represented as the percentage of a primary-winding-side voltage to a rated voltage is defined as the short-circuit impedance, where the primary-winding-side voltage is a voltage at which the current on the secondary winding side has reached a rated current. It is noted that the short-circuit impedance is sometimes called leakage impedance or the like.

Figure 3:
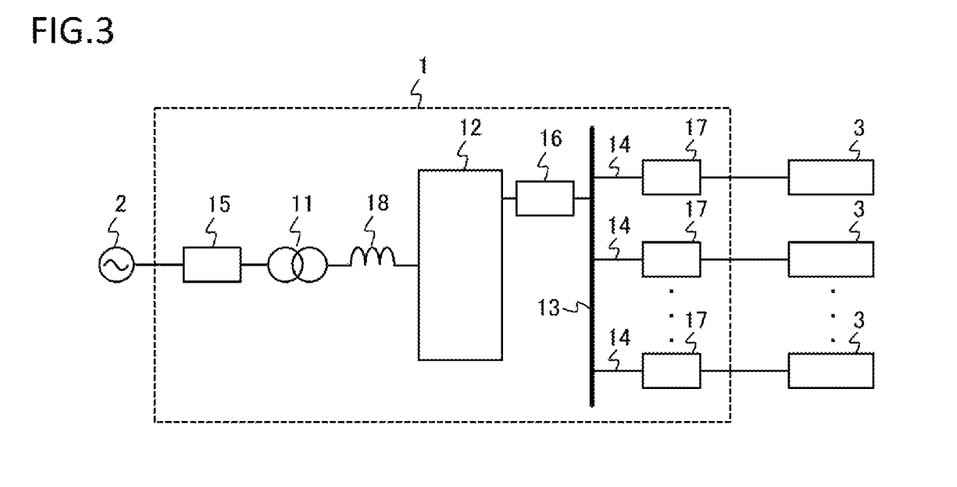
FIG. 3 is a configuration diagram of the DC power distribution system according to embodiment 1.

FIG. 3 is a configuration diagram of the DC power distribution system according to the present embodiment. In FIG. 3, a short-circuit impedance 18 of the transformer 11 is shown separately from the transformer 11. As shown in FIG. 3, the power to be inputted from the power distribution grid 2 via the transformer 11 to the rectification device 12 is inputted via the AC interrupting portion 15, the transformer 11, and the short-circuit impedance 18.

Figure 4:
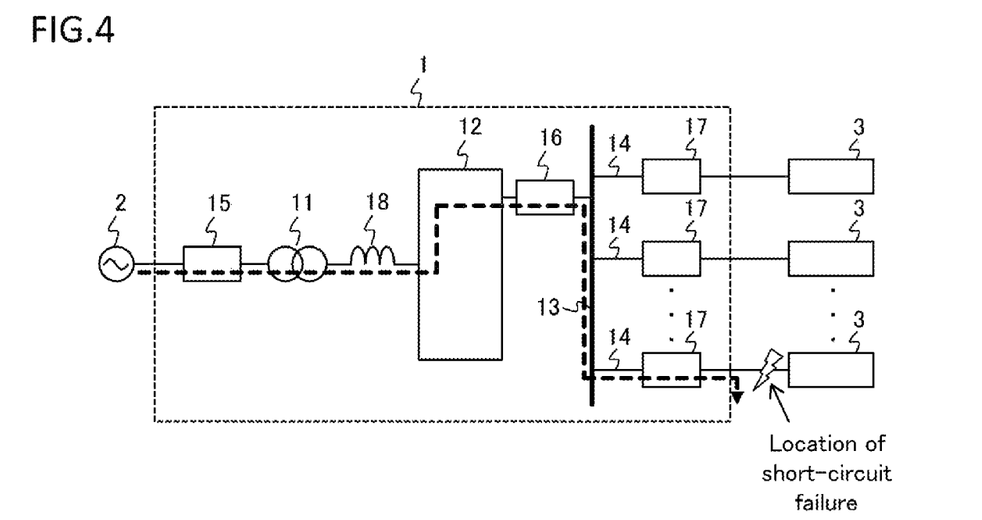
FIG. 4 is a diagram for explaining a path for short-circuit current that flows in the DC power distribution system according to embodiment 1.

FIG. 4 is a diagram for explaining a path for short-circuit current that flows in the DC power distribution system 1 according to the present embodiment. The broken-line arrow shown in FIG. 4 indicates a short-circuit current that flows into the DC power distribution system 1 from the power distribution grid 2 when a short-circuit failure occurs at one DC branch line among the plurality of DC branch lines 14 branching off from the DC bus 13. As indicated by the broken-line arrow in FIG. 4, the short-circuit current flows from the power distribution grid 2 via the AC interrupting portion 15, the transformer 11 including the short-circuit impedance 18, the rectification device 12, the first DC interrupting portion 16, the DC bus 13, the DC branch line 14, and the second DC interrupting portion 17 to the location at which the short-circuit failure has occurred. A short-circuit current I at this time can be calculated by analyzing a transient phenomenon of the AC circuit and is expressed with the following expression.

[Mathematical 1]

$$I = \sqrt{2}\, A\left\{\sin(\omega t + \theta - \phi) - \sin(\theta - \phi)\exp\left(-\frac{R}{L}\right)\right\} \quad (1)$$

Here, A and φ are defined by the following expressions.

[Mathematical 2]

$$A = \frac{V}{\sqrt{R^2 + (\omega L)^2}} \quad (2)$$

[Mathematical 3]

$$\phi = \tan^{-1}\frac{\omega L}{R} \quad (3)$$

Here, θ represents a phase angle at the time of occurrence of the short-circuit failure, ω is expressed as ω=2πf (where f represents a frequency of the AC power inputted from the power distribution grid 2), V represents an effective value of a line-to-line voltage of the secondary winding of the transformer 11, L represents an inductance value of the current path through which the short-circuit current flows, and R represents a resistance value of the current path through which the short-circuit current flows. Meanwhile, in the DC power distribution system, each of a parasitic inductance component and a parasitic resistance component of the current path excluding the transformer is designed to be a very small value in order to suppress power loss. Therefore, the inductance value L and the resistance value R are approximately equal to the values of an inductance component and a resistance component of the short-circuit impedance 18 of the transformer 11, respectively. It is noted that the above expressions (1) to (3) express a current, for one phase, of a three-phase AC power, and, when a three-phase AC power is inputted to the DC power distribution system, short-circuit currents I having phases that are different from one another by 120° are generated.

The short-circuit current I is inversely proportional to each of the inductance value L and the resistance value R. Normally, power consumption occurs in the DC power distribution system when current flows in the resistance component. Considering this, the resistance component is designed to be as small as possible. Therefore, the maximum value of the short-circuit current I is greatly dependent on the inductance of the DC power distribution system.

Short-circuit current supplied from the power distribution grid 2 when a short-circuit failure occurs, passes through the AC interrupting portion 15 and the first DC interrupting portion 16, and then passes through the second DC interrupting portion 17. In this case, if the AC interrupting portion 15 and the first DC interrupting portion 16 perform interrupting operations earlier than the second DC interrupting portion 17, it becomes impossible to supply power to all of the DC branch lines 14 of the DC power distribution system. Therefore, the second DC interrupting portion 17 needs to perform an interrupting operation earliest. If an interrupting-operation time for the second DC interrupting portion 17 is set to be shorter than an interrupting-operation time for the AC interrupting portion 15 and an interrupting-operation time for the first DC interrupting portion, only the DC branch line 14 corresponding to the location at which a short-circuit failure has occurred is separated from the power supply path in the DC power distribution system 1. Thus, power can be supplied to the other normal DC branch lines 14. As a result, the reliability of the DC power distribution system 1 is improved.

The first DC interrupting portion 16 needs to interrupt DC current, and it is generally known that, since no moment at which DC current becomes zero is present unlike AC current, interruption of DC current is more difficult than interruption of AC current. Therefore, the first DC interrupting portion 16 is assumed to be more expensive than the AC interrupting portion 15. Further, the first DC interrupting portion 16 becomes more expensive as the capacity thereof for current to be interrupted becomes higher. Therefore, the capacity of the first DC interrupting portion 16 is preferably set to be lower than the capacity of the AC interrupting portion 15 from the viewpoint of cost. As a result, the first DC interrupting portion 16 performs an interrupting operation earlier than the AC interrupting portion 15. By such a configuration, increase in device cost for the DC power distribution system 1 can be suppressed.

Furthermore, the rectification device 12 needs to continue supply of current in the DC power distribution system 1 even when a short-circuit failure occurs. In other words, the rectification device 12 needs to have a capacity for supply of short-circuit current that flows until the DC branch line 14 corresponding to the location at which the short-circuit failure has occurred is separated from the power supply path. If the rectification device 12 has a capacity for supply of short-circuit current, the rectification device 12 does not fail even upon occurrence of a short-circuit failure, and, even after the DC branch line 14 corresponding to the location at which the short-circuit failure has occurred is separated from the power supply path, power can be supplied to the other normal DC branch lines 14. As a result, the reliability of the DC power distribution system 1 is improved.

In general, for a diode, an upper limit value of current capable of being carried therein that is referred to as surge forward current or the like is specified in case of occurrence of a short-circuit failure or the like which causes high current to flow. Meanwhile, the maximum value of the short-circuit current I is greatly dependent on the inductance of the DC power distribution system. Therefore, if the inductance of the DC power distribution system is determined such that the maximum value of the short-circuit current I becomes equal to or smaller than the value of the current capable of being carried in each diode, a failure of the rectification device can be avoided even when a short-circuit failure occurs in the DC power distribution system. As described above, the inductance of the DC power distribution system is equal to the inductance component of the short-circuit impedance 18 of the transformer 11. Therefore, if the inductance value of the short-circuit impedance 18 of the transformer 11 is determined such that the maximum value of the short-circuit current I becomes equal to or smaller than the value of the current capable of being carried in the diode, the reliability of the DC power distribution system can be improved.

Normally, the inductance of the current path in the DC power distribution system is much lower than the short-circuit impedance of the transformer. As a means for obtaining a required inductance, connection of an inductance element to an input terminal side or an output terminal side of the rectification device 12 is conceivable, for example. However, the connection of the inductance element leads to additional increase in the resistance component, and thus loss in the DC power distribution system is increased. Further, at the same time, the addition of the part causes increases in cost for and the size of the DC power distribution system.

In the DC power distribution system according to the present embodiment, since the inductance value of the short-circuit impedance of the transformer is determined such that the maximum value of the short-circuit current becomes equal to or smaller than the value of the current capable of being carried in the diode, increases in cost for and the size of the DC power distribution system can be suppressed without the need for any additional part.

Embodiment 2

Embodiment 2 will give description regarding a method for determining an inductance value of the short-circuit impedance of the transformer on the basis of a maximum current value $I_{d\_lim}$ determined according to the upper limit value of the current capable of being carried in each of the diodes composing the diode rectifier in the DC power distribution system described in embodiment 1.

It is known that, if the maximum value of the short-circuit current is defined as $I_p$ and the maximum current value determined according to the upper limit value of the current capable of being carried in the diode is defined as $I_{d\_lim}$, $I_p$ is obtained with the following expression (4). In addition, the inductance value L of the short-circuit impedance of the transformer can be determined with expression (5) in consideration of the fact that $I_p$ has to be $I_{d\_lim}$ or smaller.

[Mathematical 4]

$$I_p = \frac{\sqrt{2}\,V}{\sqrt{R^2 + (\omega L)^2}} \times \frac{\sin\omega t_1}{\cos\phi} \quad (4)$$

[Mathematical 5]

$$L \geq \frac{1}{\omega}\sqrt{\frac{2V^2}{I_{d\_lim}^2} \times \frac{\sin^2\omega t_1}{\cos^2\phi} - R^2} \quad (5)$$

Here, $t_1$ is calculated with the following expression.

[Mathematical 6]

$$\frac{\cos(\omega t_1 - \phi)}{\cos\phi} = \exp\left(-\frac{R}{L}t_1\right) \quad (6)$$

Here, θ represents the phase angle at the time of occurrence of the short-circuit failure, ω is expressed as $\omega = 2\pi f$ (where f represents the frequency of the power inputted from the power distribution grid 2), V represents the effective value of the line-to-line voltage of the secondary winding of the transformer 11, and R represents the resistance value of the current path through which the short-circuit current flows. Further, φ is expressed with expression (3) in embodiment 1.

It is noted that L and $t_1$ can be respectively calculated in an approximate manner with the following expression (7) and expression (8) by performing, on a trigonometric function and an exponential function, Maclaurin expansion up to quadratic terms in expression (5) and expression (6).

[Mathematical 7]

$$t_1 \cong \frac{2L}{R} \quad (7)$$

[Mathematical 8]

$$L \leq \frac{1}{\omega}\left\{\left[4\left(\frac{2V^2}{I_{d\_lim}^2}\right)^2 + R^4\right]^{0.5} - 2\left(\frac{2V^2}{I_{d\_lim}^2}\right)^2\right\}^{0.5} \quad (8)$$

It is noted that the resistance value R of the current path of the DC power distribution system is designed to be small for realizing a highly efficient DC power distribution system. Thus, R is ignored, whereby approximation of expression (4) and expression (5) can be achieved as in the following expression (9) and expression (10), respectively.

[Mathematical 9]

$$I_p = \frac{\sqrt{2}\,V}{\sqrt{R^2 + (\omega L)^2}} \times \frac{\sin\omega t_1}{\cos\phi} \cong \frac{\sqrt{2}\,V}{\omega L} \times \frac{\sin\omega t_1}{\cos\phi} \quad (9)$$

[Mathematical 10]

$$L \geq \frac{\sqrt{2}\,V}{I_{d\_lim}} \times \frac{\sin\omega t_1}{\omega\cos\phi} \quad (10)$$

That is, if the inductance value L of the short-circuit impedance of the transformer 11 is set to a value that satisfies expression (8) or expression (10), the short-circuit current that flows at the time of occurrence of a short-circuit failure can be reduced to be equal to or lower than the current capable of being carried in the diode without the need for any additional part. As a result, increases in cost for and the size of the DC power distribution system can be suppressed.

Embodiment 3

In the DC power distribution system according to embodiment 1, the short-circuit current is inversely proportional to the inductance. In embodiment 2, the inductance value L of the short-circuit impedance of the transformer is determined on the basis of the maximum current value $I_{d\_lim}$ determined according to the upper limit value of the current capable of being carried in the diode. However, in general, if the short-circuit impedance of the transformer is increased, loss in the transformer increases, and thus the efficiency of the DC power distribution system may decrease. Further, increase of the short-circuit impedance requires: increase in the number of turns of the primary winding and the number of turns of the secondary winding in the transformer; or increase in leakage magnetic flux by elongating the spatial distance between the primary winding and the secondary winding. Thus, increase in the short-circuit impedance of the transformer leads to increase in the size of the transformer itself. Therefore, an upper limit value may be set also for the short-circuit impedance of the transformer.

Embodiment 3 will give description regarding a method for determining the maximum current value $I_{d\_lim}$ of each of the diodes composing the diode rectifier on the basis of the inductance value of the short-circuit impedance of the transformer in the DC power distribution system described in embodiment 1.

If the inductance value of the short-circuit impedance of the transformer is defined as L, the maximum current value $I_{d\_lim}$ only has to satisfy the following expression (11) since $I_{d\_lim}$ only has to be equal to or larger than the maximum value $I_p$ of the short-circuit current. Expression (11) can be derived from expression (4).

[Mathematical 11]

$$I_{d\_lim} \geq \frac{\sqrt{2}\,V}{\sqrt{R^2 + (\omega L)^2}} \times \frac{\sin\omega t_1}{\cos\phi} \quad (11)$$

If a diode having a maximum current value $I_{d\_lim}$ that satisfies expression (11) is used with the inductance value L of the short-circuit impedance of the transformer being determined, it is unnecessary to use a transformer in which the inductance value of the short-circuit impedance is excessively large. As a result, loss in the transformer is not increased, and it is also unnecessary to increase the size of the transformer. As a result, increases in cost for and the size of the DC power distribution system can be suppressed.

Embodiment 4

If the inductance value of the short-circuit impedance of the transformer is increased for reducing the short-circuit current, a larger inductance value leads to a higher voltage fluctuation rate of the transformer. Embodiment 4 will give description regarding a method for determining an inductance value of the short-circuit impedance on the basis of the voltage fluctuation rate of the transformer in the DC power distribution system described in embodiment 1.

The voltage fluctuation rate ε of the transformer is a value obtained by using an inter-winding voltage $V_{20}$ of the secondary winding under no load, relative to an inter-winding voltage $V_{2n}$ of the secondary winding under a rated load. The voltage fluctuation rate ε can be expressed with the following expression (12).

[Mathematical 12]

$$\varepsilon = \frac{V_{20} - V_{2n}}{V_{2n}} \times 100 = \frac{I_{2n}}{V_{2n}}(r\cos\alpha + \omega L \sin\alpha) \times 100 \qquad (12)$$

Here, $I_{2n}$ represents a current under a rated load, α represents a power-factor angle, and r represents a resistance component in the short-circuit impedance of the transformer.

Fluctuation of the voltage of the transformer greatly influences the DC voltage to be outputted by the rectification device. For example, if the voltage fluctuation rate increases, fluctuation of the voltage of the DC power distribution system also increases, and there is also a case where the output voltage of the DC power distribution system falls outside a DC voltage range required by a load. Thus, fluctuation of the voltage of the transformer influences the reliability of the DC power distribution system. Therefore, the voltage fluctuation rate ε of the transformer needs to be set to be equal to or lower than a voltage fluctuation rate $\varepsilon_{lim}$ that can be permitted for the DC power distribution system. Specifically, the inductance value L of the short-circuit impedance of the transformer needs to be set to a value that satisfies the following expression (13).

[Mathematical 13]

$$L \leq \frac{1}{\omega} \times \frac{V_{2n}}{I_{2n}\sin\alpha}\left(\frac{\varepsilon_{lim}}{100} - \frac{I_{2n}}{V_{2n}}r\cos\alpha\right) \qquad (13)$$

As described in embodiment 1, since the resistance component r of the transformer is sufficiently small, r is ignored, whereby approximation of expression (13) can be achieved as in the following expression (14).

[Mathematical 14]

$$L \leq \frac{1}{\omega} \times \frac{V_{2n}}{I_{2n}\sin\alpha} \times \frac{\varepsilon_{lim}}{100} \qquad (14)$$

If the inductance value of the short-circuit impedance of the transformer is determined such that this condition is satisfied, a DC power distribution system in which fluctuation of voltage is small can be obtained.

Furthermore, if expression (5) in embodiment 2 and expression (13) are combined, the following expression (15) is obtained.

[Mathematical 15]

$$\frac{1}{\omega}\sqrt{\frac{2V^2}{I_{d\_lim}^2} \times \frac{\sin^2\omega t_1}{\cos^2\phi} - R^2} \leq L \leq \frac{1}{\omega} \times \frac{V_{2n}}{I_{2n}\sin\alpha}\left(\frac{\varepsilon_{lim}}{100} - \frac{I_{2n}}{V_{2n}}r\cos\alpha\right) \qquad (15)$$

If the inductance value of the short-circuit impedance of the transformer is determined such that this condition is satisfied, the maximum value of the short-circuit current can be set to be equal to or smaller than the value of the current capable of being carried in the diode, and a DC power distribution system in which fluctuation of voltage is small can be obtained.

Embodiment 5

It is assumed that a large number of loads are in parallel to one another and connected to the output side of a DC power distribution system. In this case, the operation voltage of one of the loads may be different from the operation voltage of another load. A power conversion device for converting the voltage of DC power and a DC capacitor for stabilizing the DC voltage on the input side of the power conversion device may be connected to the DC branch line to which a load having an operation voltage different from the operation voltage of the other load is connected. The capacity of the DC capacitor is, for example, several hundreds of μF to several mF.

Figure 5:
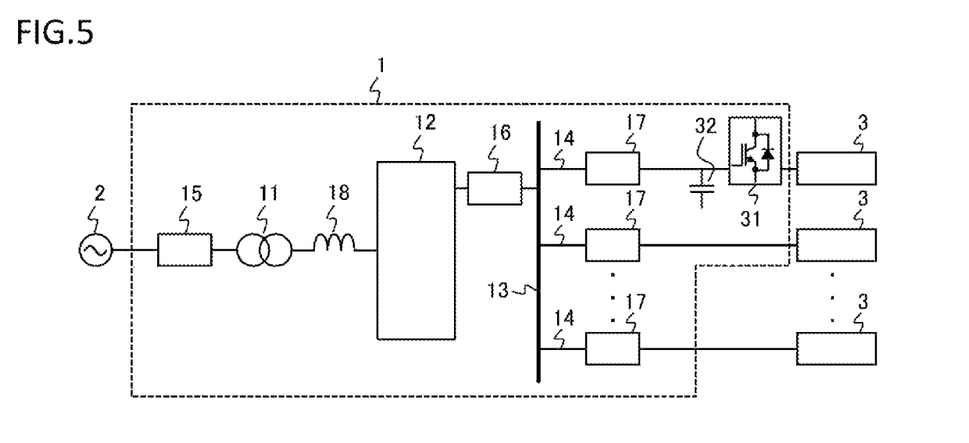
FIG. 5 is a configuration diagram of a DC power distribution system according to embodiment 5.

FIG. 5 is a configuration diagram of the DC power distribution system according to embodiment 5. As shown in FIG. 5, on one DC branch line among the plurality of DC branch lines 14, a power conversion device 31 is connected to the output side of the corresponding second DC interrupting portion 17. In addition, a DC capacitor 32 is connected to the input side of the power conversion device 31.

Figure 6:
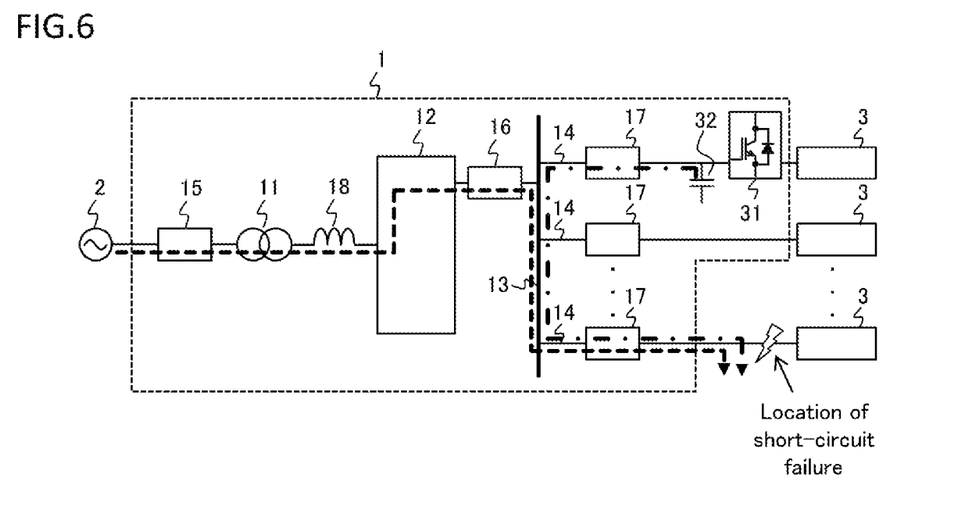
FIG. 6 is a diagram for explaining paths for short-circuit current and sneak current that flow in the DC power distribution system according to embodiment 5.

FIG. 6 is a diagram for explaining a path for a current that flows when a short-circuit failure occurs in the DC power distribution system according to the present embodiment. The broken-line arrow shown in FIG. 6 indicates a short-circuit current that flows into the DC power distribution system 1 from the power distribution grid 2 when a short-circuit failure occurs in one DC branch line among the plurality of DC branch lines 14 branching off from the DC bus 13. The alternate-long-and-short-dash-line arrow shown in FIG. 6 indicates a short-circuit current that flows to the DC bus 13 from the DC capacitor 32 when the short-circuit failure occurs. Such a current that flows from another DC branch line via the DC bus 13 to the location at which the short-circuit failure has occurred, is referred to also as sneak current. The sneak current is a current that flows out when electrical charges accumulated in the DC capacitor 32 are discharged owing to the short-circuit failure. The sneak current flows from the DC capacitor 32 via the second DC interrupting portion 17, the DC branch line 14, the DC bus 13, the DC branch line 14, and the second DC interrupting portion 17 to the location at which the short-circuit failure has occurred.

In the DC power distribution system according to the present embodiment, as described in embodiment 1, the second DC interrupting portion 17 corresponding to the location at which the short-circuit failure has occurred performs an interrupting operation to enable the short-circuit current from the power distribution grid 2 to be interrupted. Further, the AC interrupting portion 15 and the first DC interrupting portion 16 do not perform any interrupting operations, and supply of DC power from the rectification device 12 to the DC bus 13 can be continued. However, the sneak current passes through the second DC interrupting portion 17 provided to the DC branch line 14 to which the DC capacitor 32 is connected. Then, the sneak current flows via the DC bus 13 to the location at which the short-circuit failure has occurred. At this time, there is a possibility that the second DC interrupting portion 17 provided to the DC branch line 14 to which the DC capacitor 32 is connected also performs an interrupting operation owing to the sneak current. If this second DC interrupting portion 17 performs an interrupting operation, the DC branch line 14 to which the DC capacitor 32 is connected is also separated from the power supply path even though no short-circuit failure has occurred.

In the present embodiment, an initiation current value for an interrupting operation of the second DC interrupting portion 17 provided to the DC branch line 14 to which the DC capacitor 32 is connected is specified such that, when a short-circuit failure occurs, the unnecessary DC branch line 14 is not separated from the power supply path owing to the sneak current.

In the present embodiment, a sneak current $I_c$ can be obtained with the following expression (16).

[Mathematical 16]

$$I_c = \frac{V_{dc}}{R_C} \exp\left(-\frac{1}{C_{dc}R_c}t\right) \quad (16)$$

Here, $V_{dc}$ represents the voltage of the DC capacitor 32, $C_{dc}$ represents the capacitance of the DC capacitor 32, and $R_c$ represents the total value of resistance components, on the current path for the sneak current, that are inclusive of the internal resistance of the DC capacitor 32. Therefore, the second DC interrupting portion 17 provided to the DC branch line 14 to which the DC capacitor 32 is connected, is configured not to perform an interrupting operation at the current value obtained with expression (16) and is configured to perform an interrupting operation at the short-circuit current obtained with expression (1) of embodiment 1.

In the DC power distribution system configured as described above, even though the power conversion device 31 and the DC capacitor 32 are connected to one DC branch line among the plurality of DC branch lines 14, the unnecessary DC branch line 14 is not separated from the power supply path owing to sneak current generated upon occurrence of a short-circuit failure. As a result, the reliability of the DC power distribution system can be improved.

Embodiment 6

Figure 7:
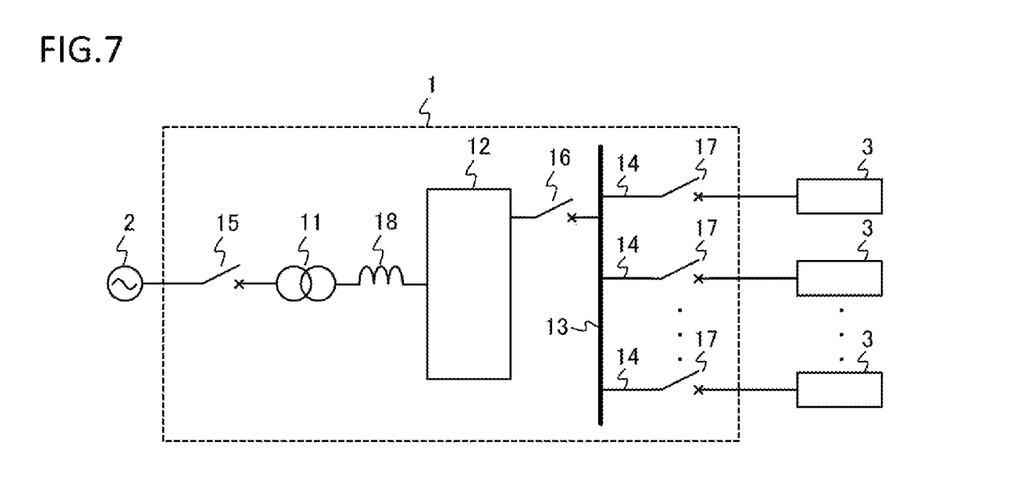
FIG. 7 is a configuration diagram of a DC power distribution system according to embodiment 6.

FIG. 7 is a configuration diagram of a DC power distribution system according to embodiment 6. In the DC power distribution system 1 according to the present embodiment, each of the AC interrupting portion 15, the first DC interrupting portion 16, and the second DC interrupting portions 17 is implemented by a no-fuse breaker. The no-fuse breaker is a circuit breaker that disconnects the current path by opening/closing between mechanical contacts, unlike a fuse. The no-fuse breaker can perform: re-closing after interruption; and repetitive interruption. Further, in each of a no-fuse breaker and a fuse, a conductor having a low resistance carries current in a steady state, whereas, in a semiconductor circuit breaker, a semiconductor carries current in a steady state. Consequently, in the semiconductor circuit breaker, loss having occurred in a steady state is larger than in the no-fuse breaker and the fuse. Therefore, if each of the AC interrupting portion 15, the first DC interrupting portion 16, and the second DC interrupting portions 17 is implemented by a no-fuse breaker as in the present embodiment, the loss in a steady state is made small, and a highly efficient DC power distribution system 1 can be realized. In addition, in the DC power distribution system 1 configured as described above, even if a short-circuit failure or the like occurs and any of the AC interrupting portion 15, the first DC interrupting portion 16, and the second DC interrupting portions 17 performs an interrupting operation, the DC power distribution system 1 can be swiftly activated again after the cause of the failure is eliminated. Thus, the operating rate of the DC power distribution system 1 is improved.

Figure 8:
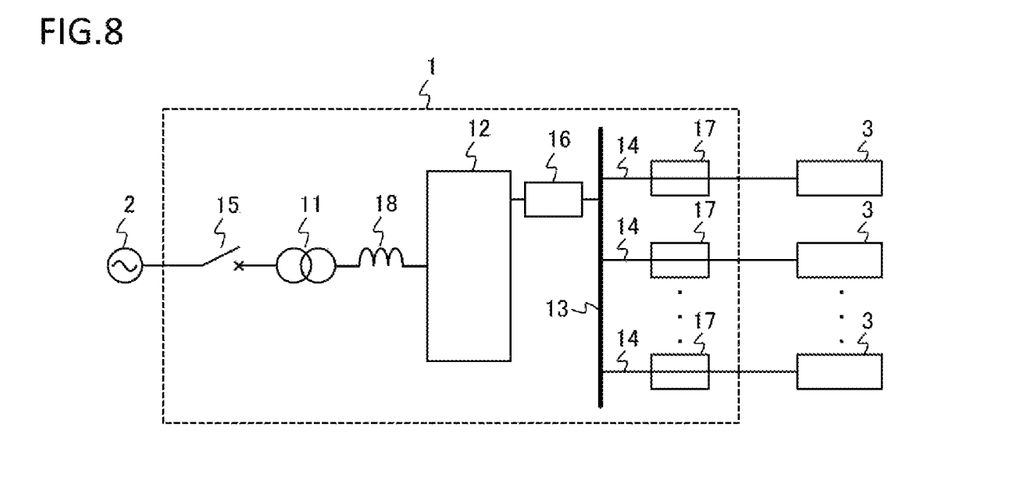
FIG. 8 is a configuration diagram of a DC power distribution system according to embodiment 6.

FIG. 8 is a configuration diagram of another DC power distribution system according to the present embodiment. In the DC power distribution system 1 shown in FIG. 8, the AC interrupting portion 15 is implemented by a no-fuse breaker, and each second DC interrupting portion 17 is implemented by a fuse. The other components are the same as the components of the DC power distribution system according to embodiment 1. In general, a fuse performs an interrupting operation earlier than a no-fuse breaker, and thus the second DC interrupting portion 17 performs an interrupting operation earlier than the AC interrupting portion 15. In the DC power distribution system 1 shown in FIG. 8, the first DC interrupting portion 16 is either a no-fuse breaker or a fuse. As described in embodiment 1, it is preferable that: the interrupting-operation time for the second DC interrupting portion 17 is set to be shortest; and the interrupting-operation time for the AC interrupting portion 15 is set to be longest. Therefore, it is preferable that the first DC interrupting portion 16 is set to perform an interrupting operation later than the second DC interrupting portion 17 and perform an interrupting operation earlier than the AC interrupting portion 15.

In the DC power distribution system configured as described above, the second DC interrupting portion performs an interrupting operation earliest, and thus only the DC branch line corresponding to the location at which a short-circuit failure has occurred is separated from the power supply path, and supply of power to the other normal DC branch lines can be continued. As a result, the reliability of the DC power distribution system is improved.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC power distribution system
2 power distribution grid
11 transformer
12 rectification device
13 DC bus
14 DC branch line
15 AC interrupting portion
16 first DC interrupting portion
17 second DC interrupting portion
18 short-circuit impedance
21 diode
22 AC terminal
23 DC terminal
31 power conversion device
32 DC capacitor

The invention claimed is:

1. A DC power distribution system comprising:
a transformer configured to convert an AC power inputted to the transformer into an AC power at a different voltage and output the AC power obtained by the conversion;
a rectification device configured to convert the AC power outputted from the transformer into a DC power and output the DC power;
a DC bus through which the DC power outputted from the rectification device flows;
a plurality of DC branch lines branching off from the DC bus;
an AC interrupting portion connected to an input side of the transformer;
a first DC interrupting portion connected between the rectification device and the DC bus; and
a plurality of second DC interrupting portions respectively provided to the plurality of DC branch lines, wherein
an interrupting-operation time for each second DC interrupting portion is set to be shorter than an interrupting-operation time for the AC interrupting portion and an interrupting-operation time for the first DC interrupting portion, and
an inductance value of a short-circuit impedance of the transformer is set to a value at which current that flows to the rectification device when short-circuit current flows in the DC power distribution system can be limited to take a value not larger than a maximum current value permitted for the rectification device.

2. The DC power distribution system according to claim 1, wherein
the rectification device is a diode rectifier, and
the maximum current value permitted for the rectification device is a maximum current value determined according to an upper limit value of current capable of being carried in a diode composing the diode rectifier.

3. The DC power distribution system according to claim 2, wherein a plurality of diodes each of which is the diode composing the diode rectifier are connected in parallel.

4. The DC power distribution system according to claim 2, wherein
if:
a frequency of the AC power inputted to the transformer is defined as f,
an effective value of a line-to-line voltage on an output side of the transformer is defined as V,
a total value of a resistance value of the short-circuit impedance of the transformer, and a parasitic resistance value of the DC bus and parasitic resistance values of the DC branch lines, is defined as R, and
the maximum current value determined according to the upper limit value of the current capable of being carried in the diode is defined as $I_{d\_lim}$,
then:
$\omega = 2\pi f$ is satisfied, and the inductance value L of the short-circuit impedance of the transformer satisfies the following expression, $$L \geq \frac{1}{\omega}\sqrt{\frac{2V^2}{I_{d\_lim}^2} \times \frac{\sin^2 \omega t_1}{\cos^2 \phi} - R^2} \qquad \text{[Mathematical 17]}$$

where $t_1$ and $\varphi$ are respectively calculated with the following expressions, $$\frac{\cos(\omega t_1 - \phi)}{\cos \phi} = \exp\left(-\frac{R}{L} t_1\right) \qquad \text{[Mathematical 18]}$$

$$\phi = \tan^{-1} \frac{\omega L}{R}. \qquad \text{[Mathematical 19]}$$

5. The DC power distribution system according to claim 2, wherein a voltage fluctuation rate of the transformer is equal to or lower than a voltage fluctuation rate that can be permitted for the DC power distribution system.

6. The DC power distribution system according to claim 5, wherein
if:
a frequency of the AC power inputted to the transformer is defined as f,
an effective value of a line-to-line voltage on an output side of the transformer is defined as V,
an inter-winding voltage of a secondary winding, under a rated load, of the transformer is defined as $V_{2n}$,
a current under a rated load is defined as $I_{2n}$,
a power-factor angle is defined as $\alpha$,
a total value of a resistance value of the short-circuit impedance of the transformer, and a parasitic resistance value of the DC bus and parasitic resistance values of the DC branch lines, is defined as R,
the maximum current value determined according to the upper limit value of the current capable of being carried in the diode is defined as $I_{d\_lim}$,
the voltage fluctuation rate that can be permitted for the DC power distribution system is defined as $\varepsilon_{lim}$, and
a resistance value of the transformer is defined as r,
then:
$\omega = 2\pi f$ is satisfied, and the inductance value L of the short-circuit impedance of the transformer satisfies the following expression, $$\frac{1}{\omega}\sqrt{\frac{2V^2}{I_{d\_lim}^2} \times \frac{\sin^2\omega t_1}{\cos^2\phi} - R^2} \leq \quad \text{[Mathematical 20]}$$

$$L \leq \frac{1}{\omega} \times \frac{V_{2n}}{I_{2n}\sin\alpha}\left(\frac{\varepsilon_{lim}}{100} - \frac{I_{2n}}{V_{2n}}r\cos\alpha\right)$$

where $t_1$ and $\varphi$ are respectively calculated with the following expressions, $$\frac{\cos(\omega t_1 - \phi)}{\cos\phi} = \exp\left(-\frac{R}{L}t_1\right) \quad \text{[Mathematical 21]}$$

$$\phi = \tan^{-1}\frac{\omega L}{R}. \quad \text{[Mathematical 22]}$$

7. The DC power distribution system according to claim 1, wherein a power conversion device and a DC capacitor connected to an input side of the power conversion device are provided to each of one or more DC branch lines among the plurality of DC branch lines.

8. The DC power distribution system according to claim 7, wherein
a plurality of the second DC interrupting portions provided to the DC branch lines to which the power conversion devices are connected do not perform any interrupting operation for sneak currents that flow from the DC capacitors when short-circuit current flows to a DC branch line other than the DC branch lines to which the power conversion devices are connected.

9. The DC power distribution system according to claim 1, wherein each of the AC interrupting portion, the first DC interrupting portion, and the plurality of second DC interrupting portions is a no-fuse breaker.

10. The DC power distribution system according to claim 1, wherein the AC interrupting portion is a no-fuse breaker, and the plurality of second DC interrupting portions are each a fuse.

11. The DC power distribution system according to claim 2, wherein
if:
a frequency of the AC power inputted to the transformer is defined as f,
an effective value of a line-to-line voltage on an output side of the transformer is defined as V,
a total value of a resistance value of the short-circuit impedance of the transformer, and a parasitic resistance value of the DC bus and parasitic resistance values of the DC branch lines, is defined as R, and
the maximum current value determined according to the upper limit value of the current capable of being carried in the diode is defined as $I_{d\_lim}$,
then:
$\omega=2\pi f$ is satisfied, and the inductance value L of the short-circuit impedance of the transformer satisfies the following expression, $$L \geq \frac{1}{\omega}\sqrt{\frac{2V^2}{I_{d\_lim}^2} \times \frac{\sin^2\omega t_1}{\cos^2\phi} - R^2} \quad \text{[Mathematical 17]}$$

where $t_1$ and $\varphi$ are respectively calculated with the following expressions, $$\frac{\cos(\omega t_1 - \phi)}{\cos\phi} = \exp\left(-\frac{R}{L}t_1\right) \quad \text{[Mathematical 18]}$$

$$\phi = \tan^{-1}\frac{\omega L}{R}. \quad \text{[Mathematical 19]}$$

\* \* \* \* \*